US010920472B2

(12) United States Patent
Trentin et al.

(10) Patent No.: US 10,920,472 B2
(45) Date of Patent: Feb. 16, 2021

(54) HINGE FOR A REMOVABLE TAILGATE (71) Applicant: FORD GLOBAL TECHNOLOGIES, LLC, Dearborn, MI (US)

(72) Inventors: Daniel Trentin, Ivanhoe (AU); Dave Spink, Jan Juc (AU)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 16 days.

(21) Appl. No.: 16/519,399

(22) Filed: Jul. 23, 2019

(65) Prior Publication Data
US 2020/0040628 A1 Feb. 6, 2020

(30) Foreign Application Priority Data

Aug. 1, 2018 (CN) .......................... 201810865622.9

(51) Int. Cl.
*E05D 7/10* (2006.01)
*B62D 33/033* (2006.01)
*E05D 3/02* (2006.01)
*B60J 5/10* (2006.01)

(52) U.S. Cl.
CPC ............ *E05D 7/1005* (2013.01); *B60J 5/108* (2013.01); *B62D 33/033* (2013.01); *E05D 3/02* (2013.01); *E05D 2007/1027* (2013.01); *E05Y 2900/546* (2013.01)

(58) Field of Classification Search
CPC .............. B62D 33/0273; B62D 33/033; B62D 33/037; B62D 33/03; E05D 3/02; E05D 7/1072; E05D 7/1011; E05D 7/12; E05D 7/121

USPC ....... 296/57.1, 50, 52, 146.4, 98, 76, 62, 56, 296/37.1; 70/14, 164, 70, 258, 360, 53, 70/101, 490
See application file for complete search history.

(56) References Cited

U.S. PATENT DOCUMENTS

| | | | |
|---|---|---|---|
| 3,734,560 A * | 5/1973 | Cramblet | B62D 33/0273 296/50 |
| 3,848,918 A | 11/1974 | Dyer | |
| 7,484,784 B2 | 2/2009 | Ohly | |
| 7,549,691 B2 | 6/2009 | Schulte et al. | |
| 7,644,973 B2 * | 1/2010 | Carloni | B62D 33/0273 296/57.1 |
| 8,696,046 B2 | 4/2014 | Sackett | |
| 8,707,745 B2 | 4/2014 | Kalous | |

(Continued)

OTHER PUBLICATIONS

How-To Install-OEM Tailgate damper "tailgate assist" for 2015/2016—Ford F 150 Forum—Community of Ford Truck Fans; 13 pages, Mar. 7, 2018; https://www.f150forum.com/f118/how-install-oem-tailgate-damper-assist-2015-2016-a-341090/.

*Primary Examiner* — D Glenn Dayoan
*Assistant Examiner* — Sunsurraye Westbrook
(74) *Attorney, Agent, or Firm* — David Coppiellie; Carlson, Gaskey & Olds (57) ABSTRACT

A hinge to removably mount a tailgate to a vehicle is provided. The hinge comprises a tailgate leaf connected to a tailgate and a body leaf connected to the box of the vehicle. The tailgate leaf is attached to the slider through a hinge pivot. The body leaf has a first chamber in which a slider can be locked and unlocked through a locking mechanism in the second chamber. The locking mechanism comprises a locking wedge, a threaded shaft, and a cam lever to operate the locking wedge without the requirement of a tool.

20 Claims, 9 Drawing Sheets

(56) References Cited

U.S. PATENT DOCUMENTS

| | | |
|---|---|---|
| 9,097,045 B2 | 8/2015 | Hausler et al. |
| 10,119,313 B2 * | 11/2018 | Higgins .............. E05D 11/0018 |
| 10,577,030 B1 * | 3/2020 | Santana ................... E05D 3/02 |
| 2012/0223541 A1 * | 9/2012 | Gianino ............. B62D 33/0273 |
| | | 296/57.1 |
| 2014/0175826 A1 * | 6/2014 | Hausler ............. B62D 33/0273 |
| | | 296/50 |
| 2018/0015634 A1 * | 1/2018 | Soanes-Brown ........ B27G 5/02 |
| 2020/0087962 A1 * | 3/2020 | Trentin .............. E05D 11/1057 |

* cited by examiner

HINGE FOR A REMOVABLE TAILGATE

CROSS-REFERENCE TO RELATED APPLICATIONS

This disclosure claims priority to CN Patent Application NO. 2018108656229, which was filed on Aug. 1, 2018 and is incorporated herein by reference in its entirety.

TECHNICAL FIELD

This disclosure relates to a hinge for a tailgate of a vehicle, in particular, relates to a hinge to enable removal of the tailgate without a tool and eliminate or reduce rattling when driving over rough roads.

BACKGROUND

A vehicle, such as a truck, has a tailgate pivotally mounted between body side panels at a rear end of the vehicle. The tailgate pivots between open and closed positions about a hinge axis. Some trucks are designed to allow the removal of the tailgate from the truck without the need for a tool. For example, the tailgate may include hinge pins extending outwardly along the hinge axis. The hinge pins are pivotally connected into journals mounted on brackets on the truck body and can be removed from the journals when the tailgate is rotated to a certain position relative to a truck floor. This design needs larger clearance within the pivot. The clearance allows for the off-axis manipulation of the tailgate so that removal can be carried out and allows greater manufacturing tolerances to prevent "pivot binding" during normal opening and closing of the tailgate. However, such clearance can cause audible rattling when driving over rough surfaces.

SUMMARY

According to an exemplary aspect of the present disclosure, a hinge to connect a tailgate to a box of a truck is provided. The hinge includes a tailgate leaf, a body leaf having a first chamber, a slider including a hinge pivot connected to the tailgate leaf and a body positioned in the first chamber at an assembled state and a locking mechanism coupled to the body leaf. The locking mechanism is configured to cause the slider to be locked and unlocked in the first chamber.

In an embodiment, the body leaf may further include a second chamber connected to the first chamber and having a first surface, and the first surface is opposite to the first chamber and is tapered. The locking mechanism may include a locking wedge received in the second chamber, a shaft connected to the locking wedge and a cam lever pivotally connected to the shaft. The slider is locked when the locking wedge is moved by the cam lever to a locked position at which the locking wedge applies a force to the body of the slider. The slider is unlocked when the locking wedge is moved by the cam lever to an unlocked position at which the body of the slider is removable from the first chamber of the body leaf.

In another embodiment, the slider may have a dovetail shape, and the first chamber of the body leaf may include a corresponding shape.

In another embodiment, the locking wedge may have a second tapered surface that corresponds to the first tapered surface of the second chamber of the body leaf.

In another embodiment, the locking mechanism may further include a cam pivot disposed on the cam lever and connected to the shaft, the shaft has a threaded portion, the locking wedge includes a hole having inner threads and the threaded portion of the shaft may at least partially pass through the locking wedge.

In another embodiment, the body of the slider may include a first surface facing the locking wedge, a second surface opposing and substantially parallel to the first surface, and a front surface. The locking mechanism may further include an alignment spring, and the alignment spring may include a loop sheet disposed on the second surface and a tongue at a free end. The free end of the alignment spring may be bent toward the front surface of the slider and the tongue may extend at a direction opposing the free end. The tailgate leaf may include a notch to receive the tongue of the alignment spring. The tongue engages the notch to align an insertion of the slider into the first chamber of the body leaf and disengages the notch after the tailgate is attached to the box.

In another embodiment, the alignment spring may be disposed between the tailgate leaf and the second surface of the slider, attached to the first surface by a fastener, and the hinge pivot may pass through the loop sheet of the alignment spring.

In another embodiment, the body leaf may include an end stop facing the front surface of the slider. The free end of the alignment spring pushes against the end stop to deform the alignment spring such that the tongue disengages from the notch of the tailgate leaf when the slider is inserted into the first chamber and is at an assembled state.

In another embodiment, the body leaf may further include a slot at the end stop.

In another embodiment, the body leaf further may include a second chamber connected to the first chamber and having a first surface opposite to the first chamber. The locking mechanism may include a locking wedge received in the second chamber, a shaft connected to the locking wedge, and a cam lever pivotally connected to the shaft. The locking wedge may include a first surface facing the first surface of the second chamber and a second surface facing an inner surface of the slider, the second surface of the locking wedge may be tapered, and the inner surface of the slider may be tapered correspondingly. The slider is locked when the locking wedge is moved by the cam lever to a locked position at which the locking wedge applies a force to the body of the slider and the slider is unlocked when the locking wedge is moved by the cam lever to an unlocked position at which the body of the slider is removable from the first chamber of the body leaf.

According to another exemplary aspect of the present disclosure, a hinge for connecting a tailgate to a box of a truck is provided. The hinge includes a tailgate leaf, a body leaf having a first chamber and a second chamber connected to the first chamber, a slider including a hinge pivot connected to the tailgate leaf and a body positioned in the first chamber at an assembled state, and a locking mechanism. The locking mechanism includes a locking wedge disposed in the second chamber, and a movement of the locking wedge in the second chamber causes the slider to be locked and unlocked in the first chamber such that the slider is removable from the body leaf at an unlocked position.

In an embodiment, the locking mechanism may include a cam lever disposed on an outer surface of the body leaf, a cam pivot disposed at an end of the cam lever, and a shaft connected to the cam pivot and the locking wedge. A rotation of the cam lever around the cam pivot causes the movement of the locking wedge in the second chamber.

In another embodiment, the locking mechanism may include a cam lever disposed on an outer surface of the body leaf, a cam pivot disposed at an end of the cam lever, and a shaft connected to the cam pivot and the locking wedge. The shaft may include a threaded portion and the threaded portion may be at least partially received in a threaded hole in the locking wedge. The rotation of the cam lever around the axis of the shaft causes rotation of the threaded shaft adjusting the position of the locking wedge along the shaft.

In another embodiment, the locking mechanism may include a threaded shaft connecting the locking wedge and the cam lever.

In another embodiment, the second chamber may have a first surface opposite to the slider. The first surface and an inner surface of the slider form a channel with different cross-sectional area along a lengthwise direction of the threaded shaft. The slider is locked when the locking wedge is positioned at a first segment of the channel having a smaller cross-sectional area and the slider is unlocked when the locking wedge is positioned at a second segment of the channel having a larger cross-sectional area.

In another embodiment, the first surface of the second chamber may be tapered and the locking wedge may have a first surface corresponding to the first surface of the second chamber and being tapered.

In another embodiment, the inner surface of the slider is tapered, and the locking wedge has a second surface facing the inner surface of the slider and being tapered.

In another embodiment, the body of the slider may include a front surface and an outer surface opposing the inner surface. The locking mechanism may further include an alignment spring. The alignment spring may include a loop sheet disposed on the outer surface of the slider and a tongue at a free end, and the free end of the alignment spring is bent toward the front surface of the slider and the tongue extends at a direction opposing a bent direction. The tailgate leaf may include a notch to receive the tongue of the alignment spring, and the tongue engages the notch to align an insertion of the slider into the body leaf and disengages the notch after the tailgate is attached to the box.

In another embodiment, the body leaf may include an end stop facing the front surface of the slider and a slot at the end stop, and the free end of the alignment spring pushes against the end stop to deform the alignment spring such that the tongue disengages from the notch of the tailgate leaf at an assembled state.

According to yet another exemplary aspect of the present disclosure, a vehicle having a first hinge and a second hinge to connect a tailgate to a box of the vehicle is provided. The vehicle has a box having a first sidewall and a second sidewall and defining a tailgate opening, a tailgate between the tailgate opening, a first hinge to connect the tailgate to the first sidewall, and a second hinge to connect the tailgate to the second sidewall. Each of the first and second hinges includes a hinge leaf attached to the tailgate, and a body leaf attached to the first sidewall or the second sidewall. The body leaf includes a first chamber and a second chamber connected to the first chamber, a slider including a hinge pivot connected to the tailgate leaf, a body positioned in the first chamber at an assembled state, and a locking mechanism. The locking mechanism includes a locking wedge disposed in the second chamber, a cam lever, and a threaded shaft connecting the locking wedge and the cam lever. The second chamber has a first tapered surface to form a channel with different cross-sectional area along a lengthwise direction of the threaded shaft, and the locking wedge includes a second tapered surface corresponding to the first tapered surface. The slider is locked when the locking wedge is moved to a first segment of the channel having a smaller cross-sectional area and the slider is unlocked when the locking wedge is moved to a second segment of the channel having a larger cross-sectional area and the tailgate is removable when the slider is at the second segment of the channel In an embodiment, the first surface of the second chamber may be tapered, and the first surface of the locking wedge may be tapered. The body of the slider may include an inner surface facing the locking wedge, an outer surface opposing the inner surface and a front surface. The locking mechanism may further include an alignment spring. The alignment spring may include a loop sheet disposed on the outer surface of the slider and a tongue at a free end, and the free end of the alignment spring may be bent toward the front surface of the slider and the tongue extends at a direction opposing a bent direction. The tailgate leaf may include a notch to receive the tongue of the alignment spring, and the tongue engages the notch such that the slider of the first hinge and the second hinge is aligned with corresponding first chamber to facilitate assembly of the tailgate by a single user without additional support.

In another embodiment, the second surface of the locking wedge may be tapered. The body of the slider may include an inner surface facing the locking wedge, an outer surface opposing a front surface, and the inner surface of the slider may be tapered. The locking mechanism may further include an alignment spring. The alignment spring includes a loop sheet disposed on the outer surface of the slider and a tongue at a free end. The free end of the alignment spring is bent toward the front surface of the slider and the tongue extends at a direction opposing a bent direction. The tailgate leaf may include a notch to receive the tongue of the alignment spring. The tongue engages the notch such that the slider of the first hinge and the second hinge is aligned with corresponding first chamber to facilitate assembly of the tailgate by one user.

In another embodiment, the hinge pivot may include a head and neck, and each of the first and second hinges may include a bushing. The bushing is disposed between the head and the tailgate leaf.

BRIEF DESCRIPTION OF THE DRAWINGS

Example embodiments will be more clearly understood from the following brief description taken in conjunction with the accompanying drawings. The accompanying drawings represent non-limiting, example embodiments as described herein.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION

The disclosed hinges for connecting a tailgate to a box of a vehicle will become better understood through review of the following detailed description in conjunction with the figures. The detailed description and figures merely provide examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various embodiments of the hinges are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

Figure 1:
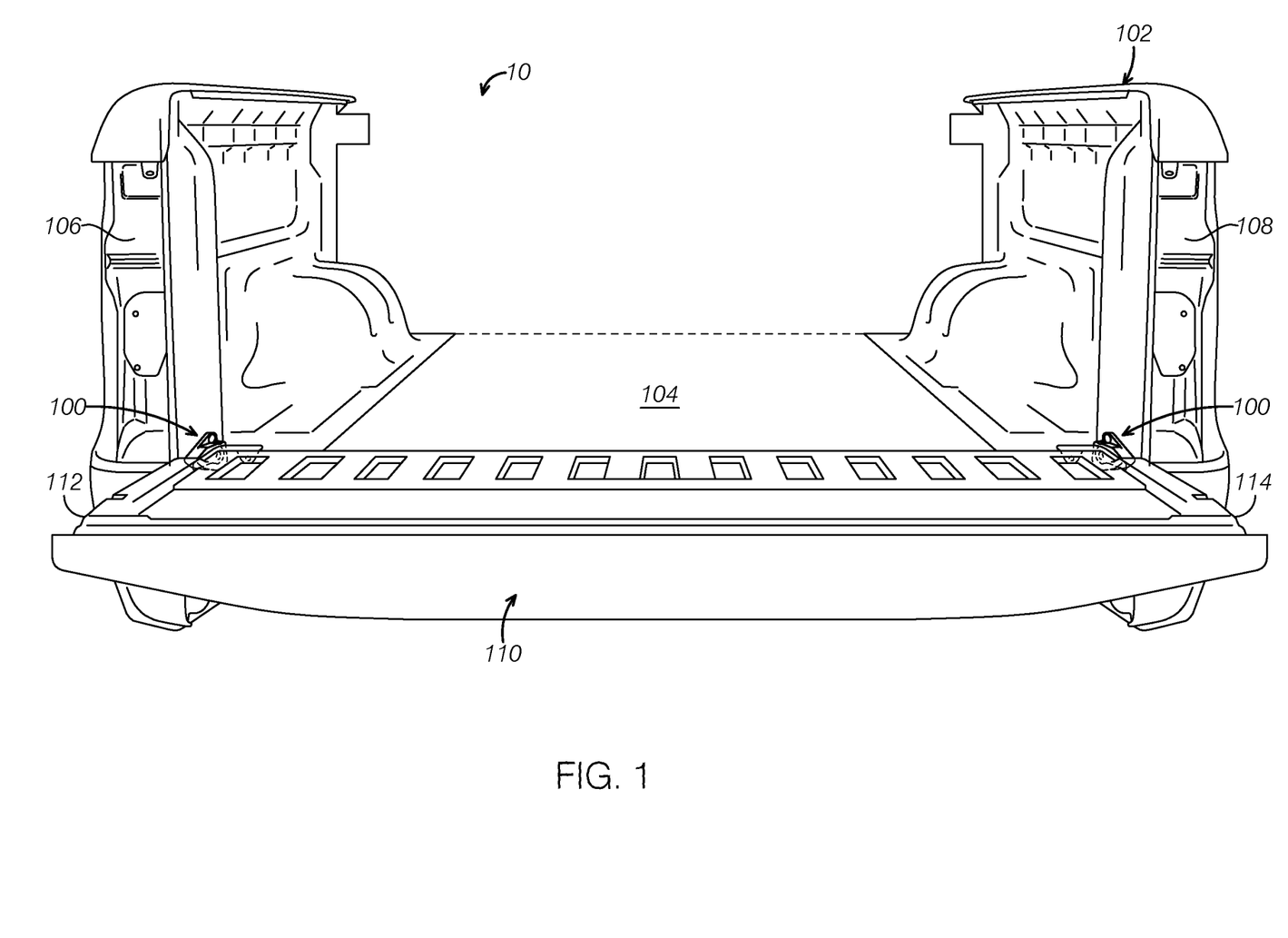
FIG. 1 is a partial perspective view of a vehicle according to an exemplary embodiment of the present disclosure.

FIG. 1 is a partial perspective view of a vehicle 10 according to one embodiment of the present disclosure. The vehicle 10 includes hinges 100 for connecting a tailgate 110 to a box 102 at an opening position. In the depicted embodiment, the vehicle 10 is a truck. The vehicle 10 includes the box 102 forming a cargo bed. The box 102 includes a floor 104, a first sidewall 106, a second sidewall 108 laterally spaced from the first sidewall 106, and the removable tailgate 110. The tailgate 110 includes a first end 112 and a second end 114. The first and second ends 112 and 114 are connected to the first and second sidewalls 106, 108, respectively. Two hinges 100 are located at the lower corners of the tailgate 110 and attached to the first and second sidewalls 106, 108 and the tailgate 110, respectively. The hinges 100 are a mirror image of each other at an assembled state.

Figure 2:
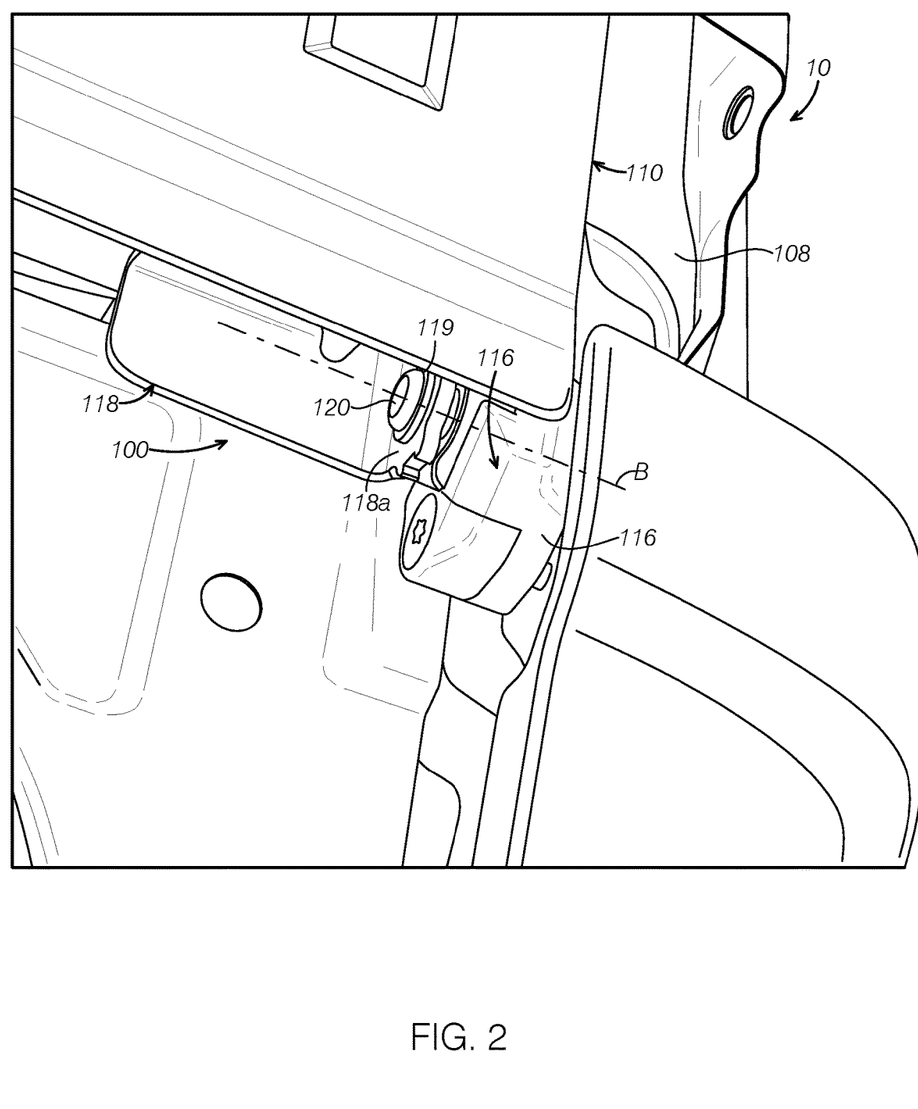
FIG. 2 is a partial perspective view of a hinge according to an exemplary embodiment of the present disclosure.
Figure 3:
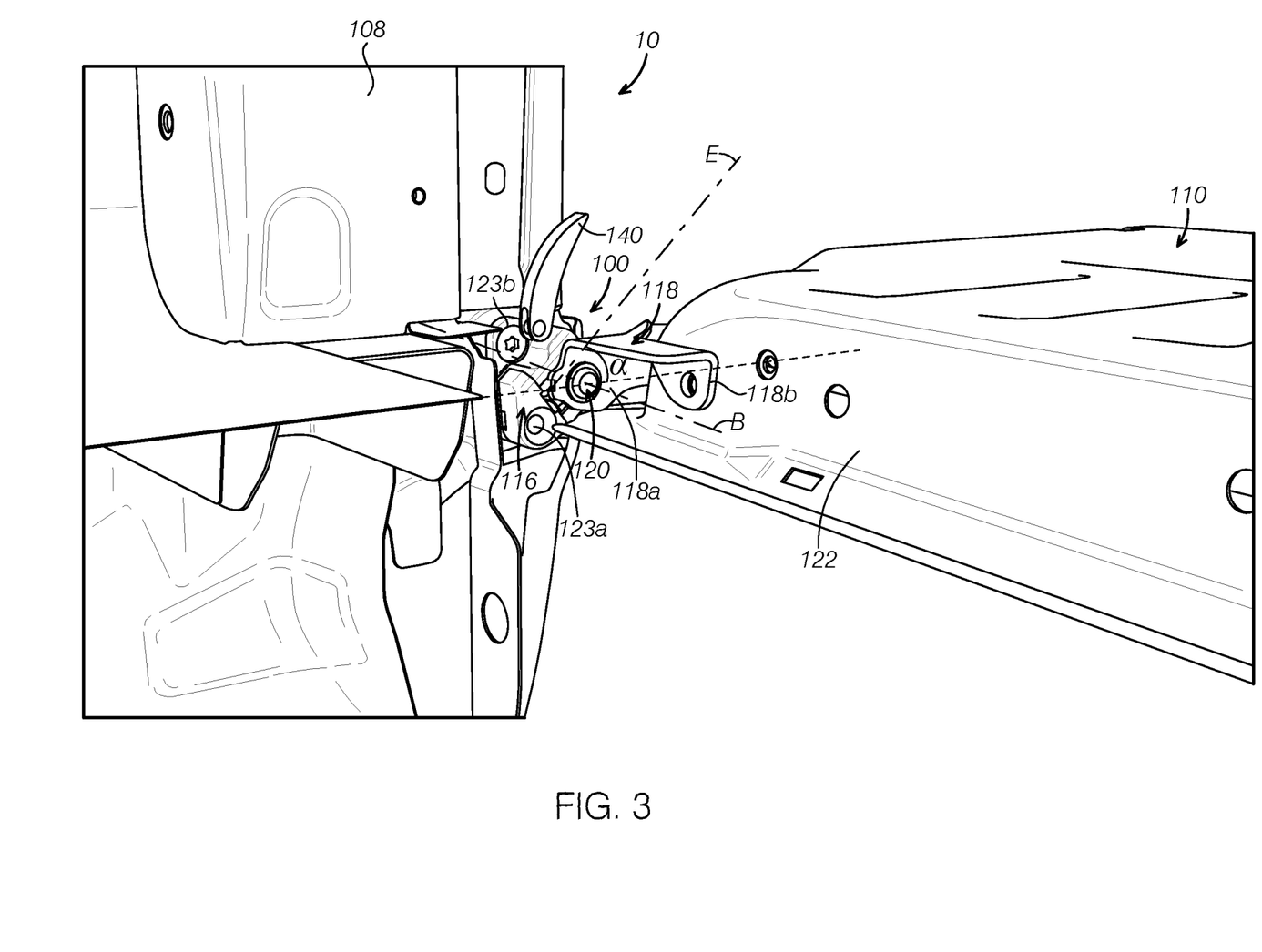
FIG. 3 shows a perspective view of the hinge in FIG. 2 and illustrates a connection of the hinge with a tailgate and a box of the vehicle at an open position of a tailgate.

FIG. 2 is a partial view of the vehicle 10 in FIG. 1 and illustrates one of the hinges 100 connecting the tailgate 110 to the second sidewall 108 of the box 102. The hinge 100 includes a body leaf 116 connected to the box 102 and a tailgate leaf 118 connected to the tailgate 110. The tailgate leaf 118 is pivotally connected to the body leaf 116 via a hinge pivot 120. The hinge pivot 120 may include a caulked securing feature 119 to allow less clearance and thus eliminate or reduce the rattle when driving over rough roads. FIG. 2 shows that the tailgate leaf 118 is connected to the body leaf 116 at a closed position. FIG. 2 further shows a hinge pivot axis B around which the tailgate leaf 118 and the tailgate 110 can pivot or rotate between an open position and a closed position. With further reference to FIG. 3, in an embodiment, the tailgate leaf 118 may include a first part 118a substantially parallel to the second sidewall 108 and connected to the hinge pivot 120 and a second part 118b connected to a bottom end 122 of the tailgate 110. The body leaf 116 has two holes 123a, 123b through which the body leaf 116 is attached to the second sidewall 108 via fasteners. It should be appreciated that another hinge 100 may be similarly attached to the first sidewall 106 of the box 102.

Figure 4:
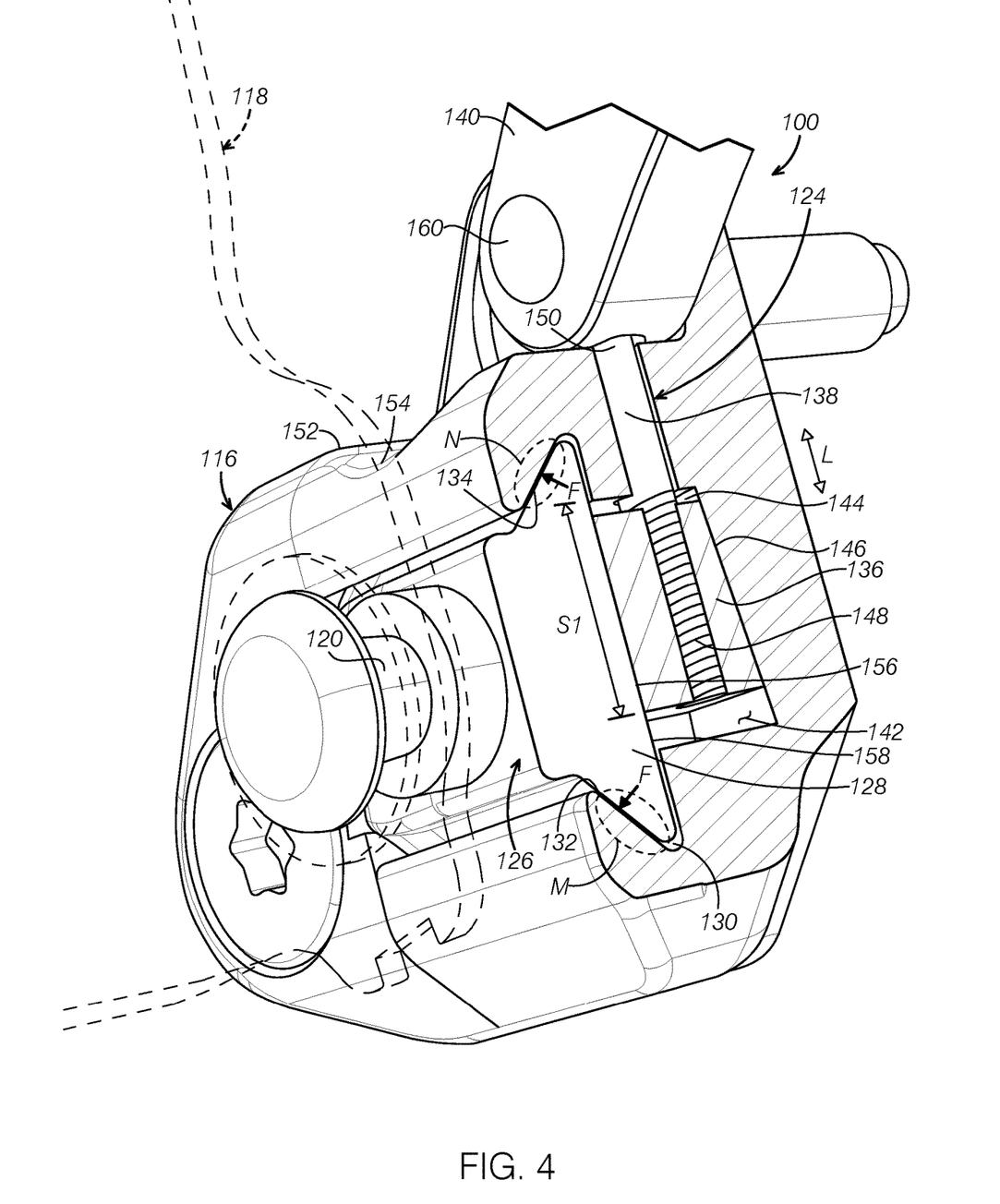
FIG. 4 is a cross sectional view of the hinge in FIG. 2 and illustrates a locking mechanism at a locked position.
Figure 5:
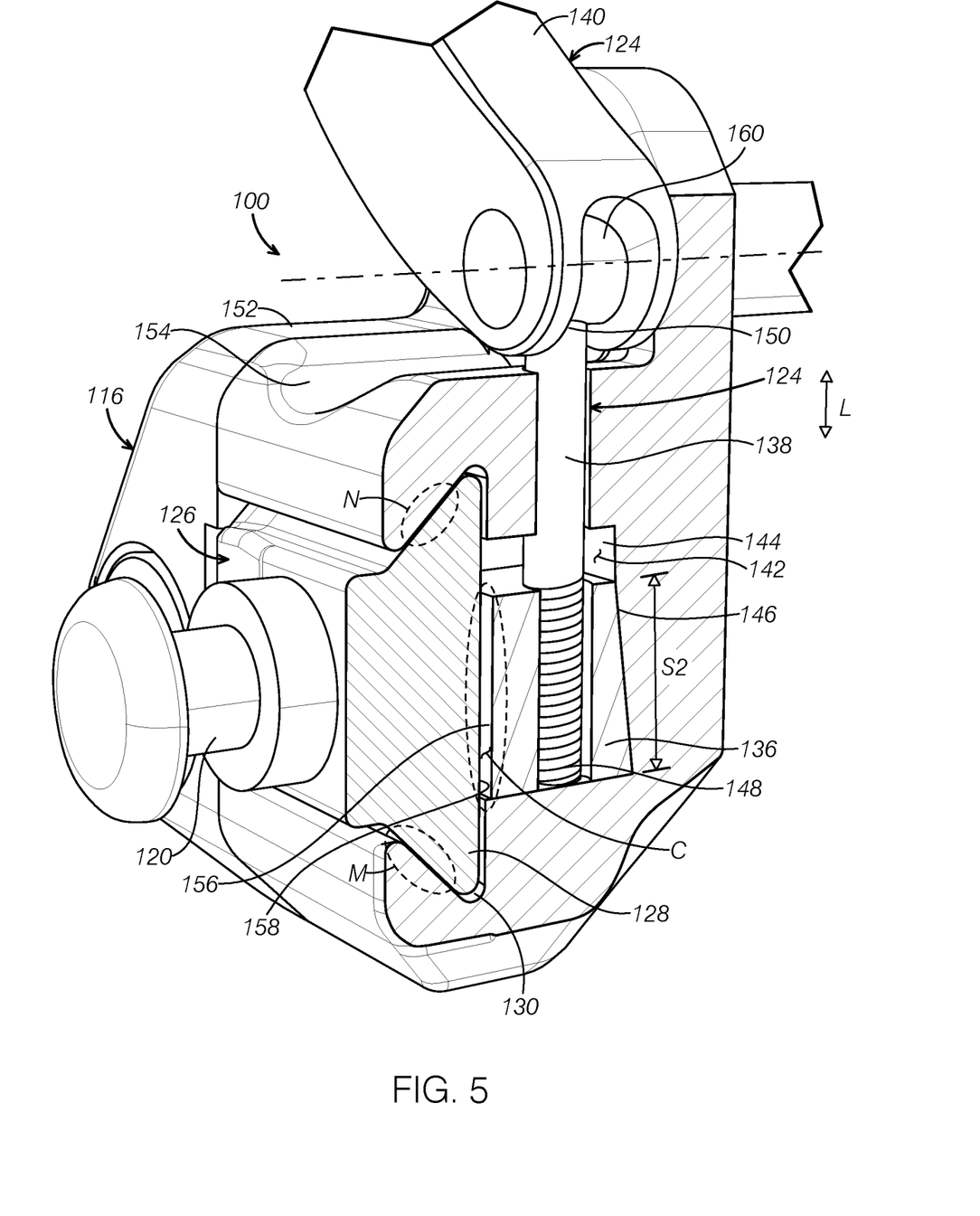
FIG. 5 is a cross sectional view of the hinge in FIG. 2 and illustrates the locking mechanism at an unlocked position.

FIG. 3 is a perspective partial view of the vehicle 10 of FIG. 1 and illustrates a connection of the hinge 100 with the second sidewall 108 and the tailgate 110 at an open position of the tailgate 110. FIG. 4 illustrates a locking mechanism 124 of the hinge 100 in a locked position, and FIG. 5 illustrates the locking mechanism 124 of the hinge 100 at an unlocked position. The tailgate leaf 118 is partially shown in dash lines in FIG. 4. For clarity of illustration, the tailgate leaf 118 is removed in FIG. 5.

Referring to FIGS. 3-5, the hinge 100 includes the tailgate leaf 118, the body leaf 116, a slider 126, and the locking mechanism 124. The slider 126 includes a body 128 coupled with the body leaf 116 and the hinge pivot 120 connected with the tailgate leaf 118. The locking mechanism 124 is coupled to the body leaf 116 to cause the slider 126 to be locked and unlocked with the body leaf 116. In an embodiment, the slider 126 is dovetail shaped at its cross section and is received in a first chamber 130 of the body leaf 116. The first chamber 130 of the body leaf 116 is configured to have slanted surfaces 132, 134 corresponding to the sloped surfaces of the dovetailed shape of the slider 126. The contacting area of the slider 126 with the slanted surfaces 132, 134 are shown as a region M and a region N, respectively, in FIG. 4.

In some embodiments, the locking mechanism 124 may include a locking wedge 136, a shaft 138 connected to the locking wedge 136, and a cam lever 140. The body leaf 116 may further include a second chamber 142 adjacent to and connected to the first chamber 130 to receive the locking wedge 136 and the shaft 138. The second chamber 142 includes a first surface 144 opposite and away from the slider 126, and the locking wedge 136 has a first surface 146 that is adjacent to or corresponds to the first surface 144 of the second chamber 142. In the embodiment depicted in FIGS. 4-5, the first surface 144 of the second chamber 142 is tapered, and the first surface 146 of the locking wedge 136 is tapered correspondingly. In some embodiments, the shaft 138 may include a threaded portion 148 connected to the locking wedge 136 such that the shaft 138 is fastened to the locking wedge 136 via a thread connection of the threaded portion 148 and corresponding inner threads (not shown) in the locking wedge 136. The cam lever 140 is pivotally connected to the shaft 138 at an end 150 opposite the threaded portion 148. The locking wedge 136 can be moved along an axis of the shaft 138 or along a lengthwise direction L within the second chamber 142 via an operation of the cam lever 140. Further, with the threaded portion 148, a rotation of the cam lever 140 around an axis of the shaft 138 causes a rotation of the shaft 138 to adjust the position of the locking wedge 136 along the lengthwise direction L. By repositioning the locking wedge 136 on the shaft 138, the displacements normal to L made by the locking wedge 136 via an operation of the cam lever 140 will vary. This function allows the locking wedge 136 and tapered surface 144 to be adjusted for optimum operation under all manufacturing tolerance conditions.

The cam lever 140 is disposed outside and above the body leaf 116.

Referring again to FIG. 3 and with further reference to FIG. 2, the tailgate leaf 118 is attached to the tailgate 110 and is connected to the slider 126 via the hinge pivot 120. The tailgate 110 pivots about the axis B of the hinge pivot 120 between a closed position shown in FIG. 2 and an open position shown in FIG. 3. In both the open and closed positions, the tailgate 110 needs to be firmly attached to the body leaf 116 unless a user wants to detach and remove the tailgate 110. The locking of tailgate 110 to the first and second sidewalls 106, 108 may be achieved via the locking mechanism 124 as described in detail associated with FIGS. 4-5. At the locked position, the slider 126 is locked to the body leaf 116 to prevent sliding in the first chamber 130 of the body leaf 116. At the unlocked position, the slider 126 is free to slide along the first chamber 130 of the body leaf 116 to allow removal of the tailgate 110. The body leaf 116 may be mounted to the first and second sidewalls 106, 108 such that a sliding axis E (see FIG. 3) of the slider 126 is at an angle a to the floor 104 of the box 102. In some embodiments, the angle a may be in a range of about 45 to 70 degrees. At the unlocked position, the tailgate 110 can be removed from the truck when the tailgate 110 is translated rearwards and at the angle a relative to the floor 104. Rearwards refers to a direction away from a front of the vehicle.

Turning again to FIGS. 4 and 5, the locking mechanism 124 is coupled to the body leaf 116 to cause the slider 126 to be locked and unlocked in the first chamber 130 of the body leaf 116. The locking mechanism 124 includes the locking wedge 136 received in the second chamber 142 of the body leaf 116. The locking wedge 136 may be made from metal such as steel. Similarly, the slider 126 may be made from metal such as steel. The locking wedge 136 has a second surface 156 opposite to the first surface 146 and facing an inner surface 158 of the slider 126. In the embodiment depicted in FIGS. 4-5, the first surface 146 of the locking wedge 136 and the first surface 144 of the second chamber 142 are tapered. The second surface 156 of the locking wedge 136 and the inner surface 158 of the slider 126 are flat or substantially parallel to the lengthwise direction L of the shaft 138. The first surface 146 of the locking wedge 136 is slightly tapered and faces the tapered first surface 144 of the second chamber 142 of the body leaf 116. The taper angle of the first surface 146 of the locking wedge 136 corresponds to the taper angle of the first surface 144 of the second chamber 142 of the body leaf 116. With at least one tapered surface at the lengthwise direction L, the first surface of 144 of the second chamber 142 and the inner surface 158 of the slider 126 form a channel of varying cross-sectional areas along a lengthwise direction L of the threaded shaft 138. The cross-sectional areas refer to the areas substantially perpendicular to the lengthwise direction L. A first segment 51 of the second chamber 142 includes cross-sectional areas smaller than those of a second segment S2.

Figure 6:
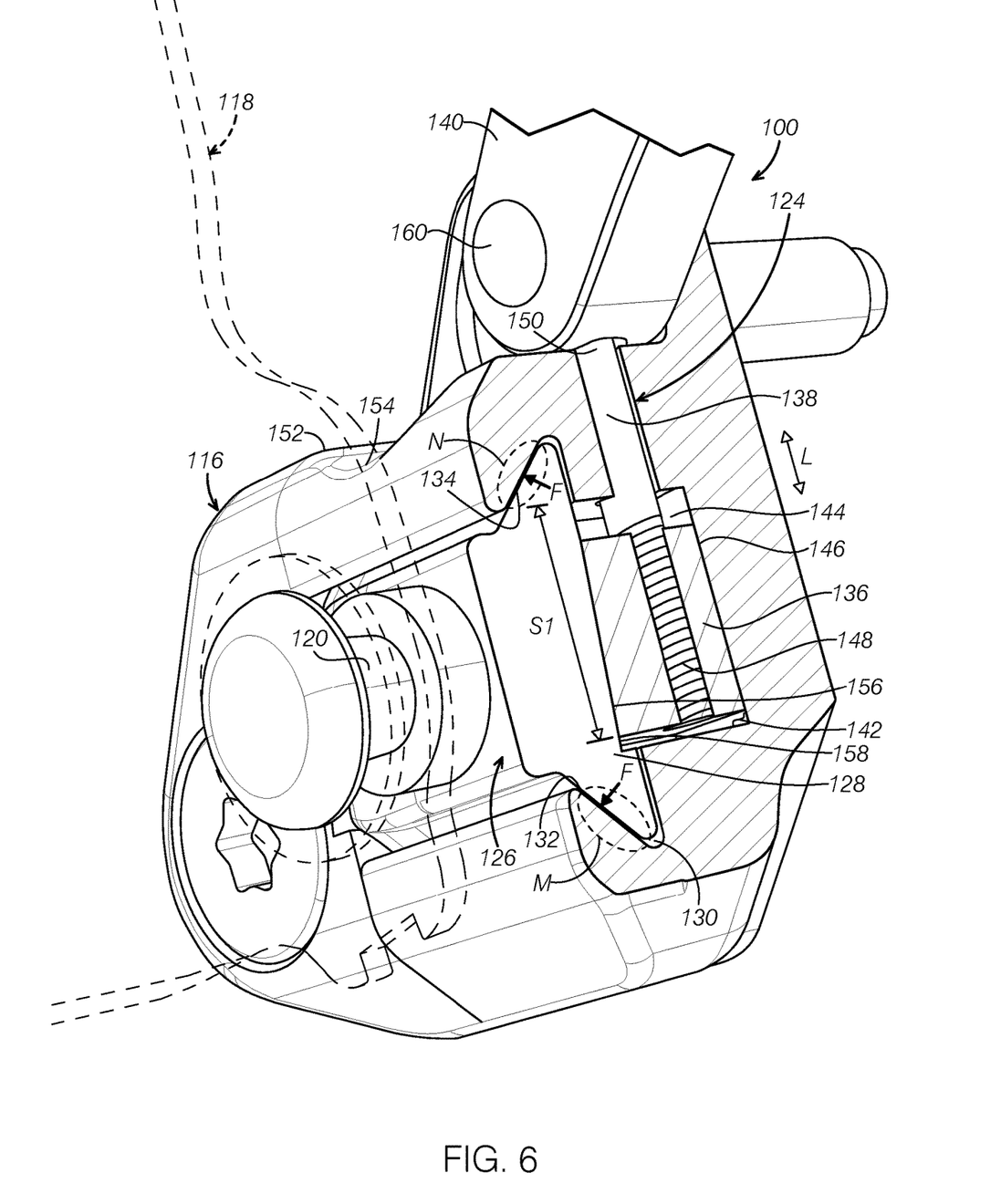
FIG. 6 is a cross sectional view of the hinge in FIG. 2 and illustrates a locking mechanism at a locked position according to another embodiment of the present disclosure.

Alternatively, as shown in FIG. 6, the second surface 156 of the locking wedge 136 may be tapered and the inner surface 158 of the slider 126 may be tapered accordingly. The tapered inner surface 158 of the slider 126 and the first surface 144 of the second chamber 142 form a channel of varying cross-sectional areas along a lengthwise direction L of the threaded shaft 138.

In yet another embodiment, both the first surface 146 and the second surface 156 of the locking wedge 136 may be tapered. The first surface 144 of the second chamber 142 and the inner surface 158 of the slide 126 may be tapered accordingly.

Referring again to FIG. 4, the slider 126 is locked from movement when the locking wedge 136 is pulled up by the cam lever 140 and positioned at the first segment 51 of the second chamber 142. In the depicted embodiment, the shaft 138 is connected to a cam pivot 160 located in the cam lever 140. The cam lever 140 pivots around the cam pivot 160 in clockwise and counterclockwise directions to cause movement of the locking wedge 136 in the second chamber 142 along the lengthwise direction L of the shaft 138. As the locking wedge 136 is moved up by the cam lever 140, the locking wedge 136 is translated to the left. This movement reduces the clearance between the second surface 156 of the locking wedge 136 and the inner surface 158 of the slider 126 until there is no clearance. At the locked position shown in FIG. 4, the locking wedge 136 applies a force F on the slider 126 at the regions M and N. The force F increases friction between the slider 126 and the body leaf 116 and effectively locks the slider 126 into the leaf body 116

Referring to FIG. 5, to unlock the slider 126, the cam lever 140 is rotated counterclockwise which causes the shaft 138 and thus the locking wedge 136 to move from the first segment S1 down to the second segment S2 and positioned in the second segment S2. This movement opens up a clearance C between the second surface 156 of the locking wedge 136 and the inner surface 158 of the slider 126. The clearance C removes friction forces at the regions M and N and allow the slider 126 to move out the body leaf 116. The locking and unlocking of the slider 126 to the body leaf 116 and thus the locking and unlocking of the tailgate 110 can be performed by the user using the cam lever 140. Thus, no tool is needed for the tailgate removal.

Figure 7:
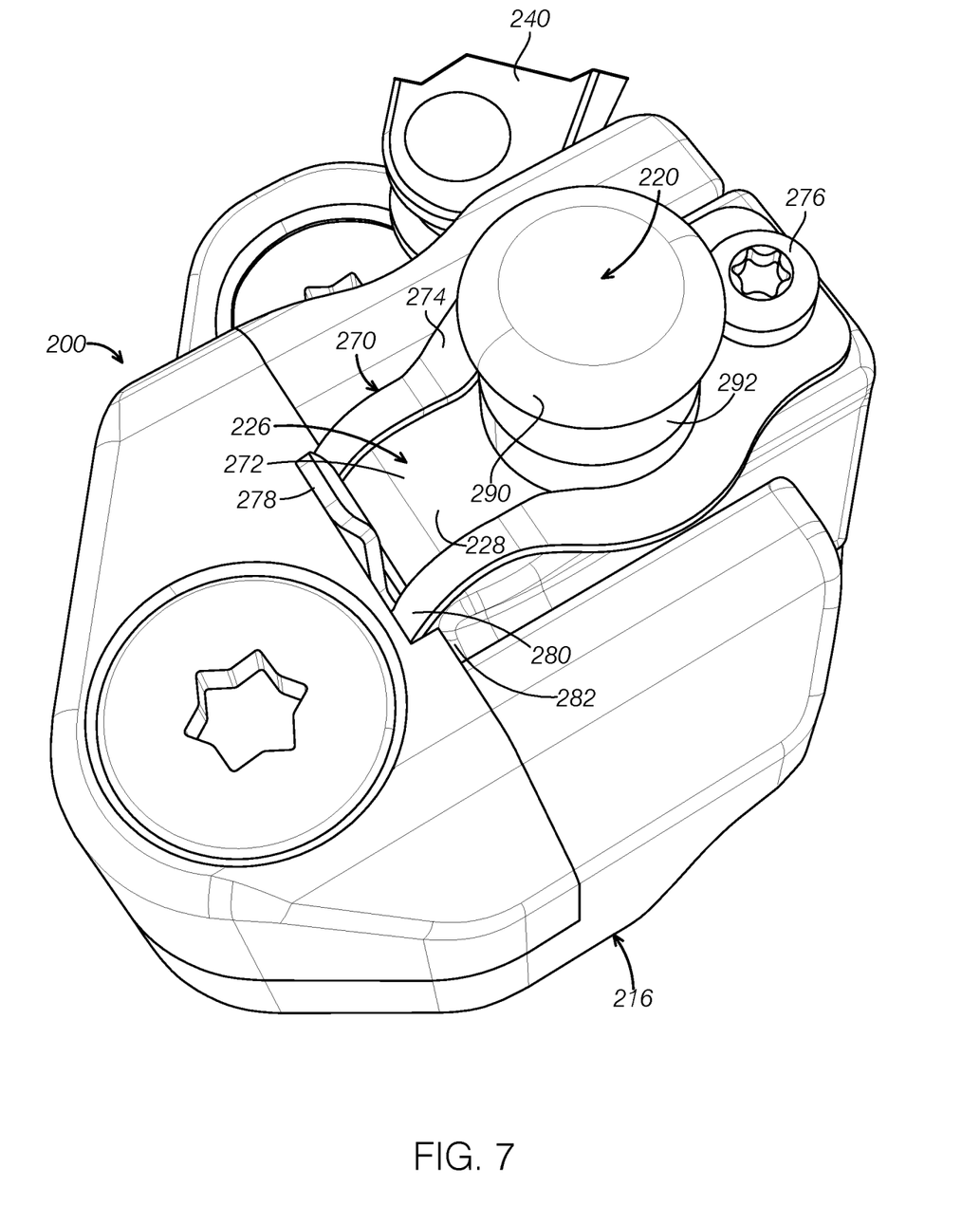
FIG. 7 is a partial perspective view of a hinge for connecting a tailgate and a box of a truck according to another embodiment of the present disclosure.
Figure 8:
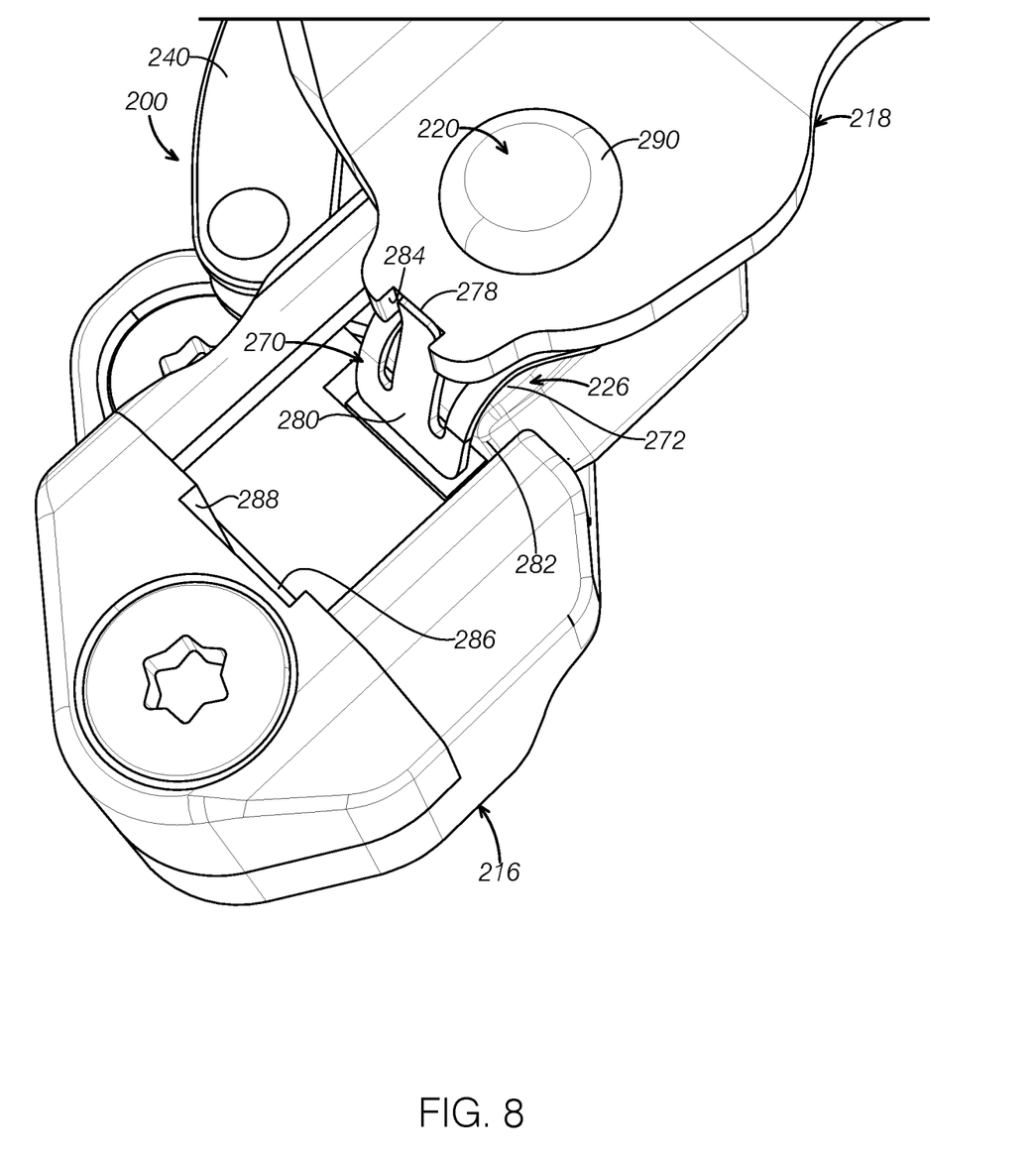
FIG. 8 is a perspective view of the hinge in FIG. 7 and illustrates a preassembled state at which a tailgate leaf and an alignment spring are engaged.
Figure 9:
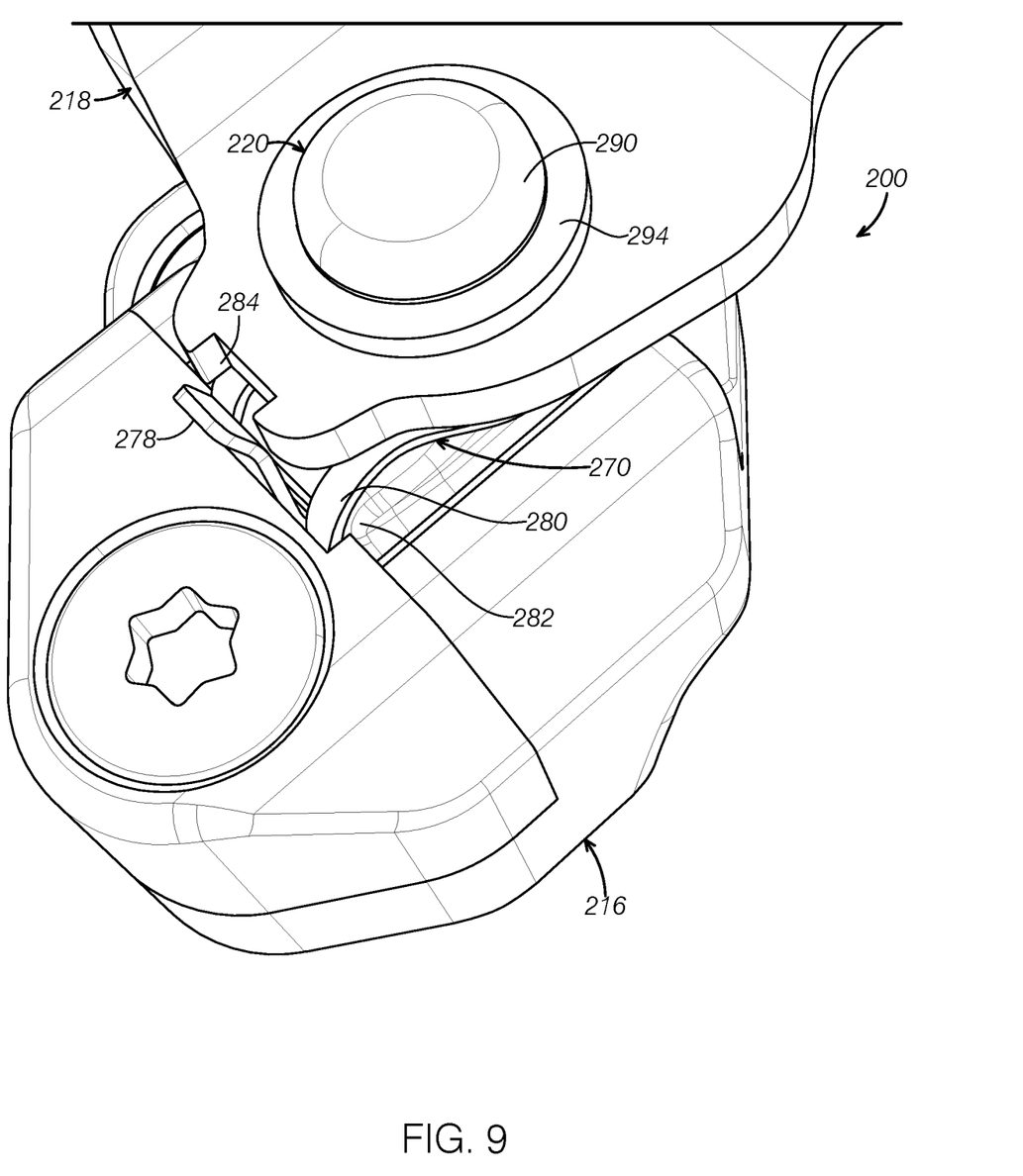
FIG. 9 is a perspective view of the hinge in FIG. 7 and illustrates an assembled state at which the tailgate leaf and the alignment spring are disengaged.

FIGS. 7-9 show a hinge 200 according to another embodiment of the present disclosure. For the sake of brevity, the same or similar features are not described in detail and only the differences are described. The hinge 200 may comprise a tailgate leaf 218, a body leaf 216, a slider 226 including a hinge pivot 220 connected to the tailgate leaf 218 and a body 228 positioned in the body leaf 216, and a locking mechanism (not shown) coupled to the body leaf 216 to cause the slider 226 to be locked and unlocked in the body leaf 216. The hinge 200 differs from the hinge 100 in that the hinge 200 further comprises an alignment spring 270. The alignment spring 270 is disposed between the tailgate leaf 218 and an outer surface 272 of the slider 226. The alignment spring 270 may include a sheet with a hole or a loop sheet 274 to allow the hinge pivot 220 to pass through the hole or the loop sheet. The alignment spring 270 may be made from spring steel. The alignment spring 270 may be attached to the body leaf 216 by any appropriate approaches such as via a fastener 276 at one end. The alignment spring 270 may include a tongue 278 at a free end 280. The free end 280 of the alignment spring 270 is bent toward a front surface 282 of the slider 226. The tongue 278 extends at a direction opposing the bending direction of the free end 280, That is, the tongue 278 extends toward the tailgate leaf 218.

When mounting of the tailgate 110 to the truck, the tailgate 110 leaves on both sides of the tailgate have to be aligned in the same direction or angles with respect to the sliders to allow an insertion of both the sliders attached at two ends of the tailgate into the first chambers in the body leaves simultaneously such that one user can perform the assembling easily. The hinge 200 is configured to facilitate the assembling by one user. For example, the tailgate leaf 218 includes a notch 284 to receive the tongue 278 of the alignment spring 270. Prior to insertion of the slider 226 into the body leaf 216 or at a preassembled state, each of the tailgate leaf 218 at both sides of the tailgate 110 is rotated around the hinge pivot 220 until the tongue 278 engages the notch 284 and is locked by the tongue 278. In this way, the tailgate leaf 218 on both sides are aligned to the sliders and the sliders of the two hinges have the same orientation relative to the truck. Thus, one user can easily assemble the tailgate 110 onto the truck. The cam lever 240 of a locking mechanism is unlocked during assembling so that the sliders can be inserted into the first chamber of the body leaf. FIG. 8 shows that the tongue 278 is received in the notch 284 of the tailgate leaf 218.

FIG. 9 shows the hinge 200 at an assembled state. With further reference to FIG. 8, the body leaf 216 may include an end stop 286 facing the front surface 282 of the slider 226. The body leaf further includes a slot 288 at the end stop 286. Upon completion of an insertion of the slider 226 into the first chamber of the body leaf 216, the bent portion on the free end 280 of the alignment spring 270 pushes against the end stop 286 to deform the alignment spring 270 such that the tongue 278 disengages from the notch 284 of the tailgate leaf 218. Such deformation releases the tongue 278 from the notch 284 on the tailgate leaf 218 thereby allowing free rotation of the tailgate leaf 218 and thus the tailgate along the hinge pivot 220 between the open and the closed positions. After the assembling, the cam lever 240 is rotated to the locked position to lock further movement of the slider 226 in the assembled state.

Referring to FIGS. 7-9, the hinge pivot 220 may include a head 290 and a neck 292. The hinge 200 may include a bushing 294 disposed between the head 290 and the tailgate leaf 218. The bushing 294 may be made from a composite material of compounded Polytetrafluoroethylene (PTFE) and metal. For example, the bushing 294 may include PTFE tape on a metal shell. The caulked pivot pin with the hushing can prevent any movement within the pivot other than the intended rotation and thus no rattle.

The hinges of the present disclosure can have about a zero or less clearance at a region between the hinge pivot and the chamber in the body leaf at the assembled state, which eliminates or reduces the rattling when driving over rough roads. The hinges can be locked and unlocked via a locking mechanism connected to the body leaf, and thus no tool is needed to unlock during the removal and assembling of the tailgate from the vehicle.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

What is claimed is:

1. A hinge to connect a tailgate to a box of a truck, comprising:
   a tailgate leaf;
   a body leaf having a first chamber;
   a hinge pivot pivotally connecting the tailgate leaf to the body leaf;
   a slider movably positioned in the first chamber; and
   a locking mechanism coupled to the body leaf and configurable in a first position to lock the slider in the first chamber and configurable in a second position to unlock the slider in the first chamber.

2. The hinge of claim 1, wherein the body leaf further includes a second chamber connected to the first chamber and having a first surface, and the first surface is opposite to the first chamber and is tapered, and
   the locking mechanism including a locking wedge received in the second chamber, a shaft connected to the locking wedge, and a cam lever pivotally connected to the shaft,
   wherein the slider is locked when the locking wedge is moved by the cam lever to a locked position at which the locking wedge applies a force to the slider,
   wherein the slider is unlocked when the locking wedge is moved by the cam lever to an unlocked position at which the slider is removable from the first chamber of the body leaf.

3. The hinge of claim 2, wherein the slider includes a dovetail shape, and the first chamber of the body leaf includes a corresponding shape.

4. The hinge of claim 3, wherein the locking wedge has a first surface that corresponds to the first surface of the second chamber of the body leaf and is tapered accordingly.

5. The hinge of claim 2, wherein the locking mechanism further include a cam pivot disposed on the cam lever and connected to the shaft, the shaft has a threaded portion, and the locking wedge includes a hole having inner threads, and wherein the threaded portion of the shaft at least partially passes through the hole of the locking wedge.

6. The hinge of claim 5, wherein a body of the slider includes an inner surface facing the locking wedge, an outer surface opposing the inner surface, and a front surface,
   wherein the locking mechanism further includes an alignment spring, and the alignment spring includes a loop sheet disposed on the outer surface and a tongue at a free end,
   wherein the free end of the alignment spring is bent toward the front surface of the slider and the tongue extends at a direction opposing the free end,
   wherein the tailgate leaf includes a notch to receive the tongue of the alignment spring, and
   wherein the tongue engages the notch to align an insertion of the slider into the first chamber of the body leaf and disengages the notch after the tailgate is attached to the box.

7. The hinge of claim 6, wherein the alignment spring is disposed between the tailgate leaf and a second surface of the slider and is attached to the body leaf by a fastener, and the hinge pivot passes through the loop sheet of the alignment spring.

8. The hinge of claim 7, wherein the body leaf includes an end stop facing the front surface of the slider, the free end of the alignment spring pushes against the end stop to deform the alignment spring such that the tongue disengages from the notch of the tailgate leaf when the slider is inserted into the first chamber.

9. The hinge of claim 8, wherein the body leaf further includes a slot at the end stop.

10. The hinge of claim 1, wherein the body leaf further includes a second chamber connected to the first chamber and having a first surface opposite to the first chamber,
   wherein the locking mechanism includes a locking wedge received in the second chamber, a shaft connected to the locking wedge, and a cam lever pivotally connected to the shaft,
   wherein the locking wedge includes a first surface facing the first surface of the second chamber and a second surface facing an inner surface of the slider, the second surface of the locking wedge is tapered, and the inner surface of the slider is tapered correspondingly,
   wherein the slider is locked when the locking wedge is moved by the cam lever to a locked position at which the locking wedge applies a force to the body of the slider, and
   wherein the slider is unlocked when the locking wedge is moved by the cam lever to an unlocked position at which the body of the slider is removable from the first chamber of the body leaf.

11. A hinge to connect a tailgate to a box of a truck, comprising:
   a tailgate leaf;
   a body leaf having a first chamber and a second chamber connected to the first chamber;
   a slider including a hinge pivot connected to the tailgate leaf and a body movably positioned in the first chamber; and
   a locking mechanism,
   wherein the locking mechanism includes a locking wedge movably disposed in the second chamber,
   wherein the locking wedge is movable between a first position in which the slider is locked in the first chamber and a second position in which the slider is unlocked in the first chamber,
   wherein the slider is removable from the body leaf when the locking wedge is in the second position.

12. The hinge of claim 11, wherein the locking mechanism includes a cam lever disposed on an outer surface of the body leaf, a cam pivot disposed at an end of the cam lever, and a shaft connected to the cam pivot and the locking wedge, and wherein a rotation of the cam lever around the cam pivot causes the movement of the locking wedge in the second chamber.

13. The hinge of claim 12, wherein the second chamber has a first surface opposite to the slider, wherein the first surface of the second chamber and an inner surface of the slider form a channel with different cross-sectional area along a lengthwise direction of the shaft, and wherein the slider is locked when the locking wedge is positioned at a first segment of the channel having a smaller cross-sectional area and the slider is unlocked when the locking wedge is positioned at a second segment of the channel having a larger cross-sectional area.

14. The hinge of claim 13, wherein the first surface of the second chamber is tapered, and the locking wedge has a first surface corresponding to the first surface of the second chamber and is also tapered.

15. The hinge of claim 13, wherein the inner surface of the slider is tapered, and the locking wedge has a second surface facing the inner surface of the slider and is tapered.

16. The hinge of claim 13, wherein the slider includes a front surface and an outer surface opposing and substantially parallel to the inner surface,
   wherein the locking mechanism further includes an alignment spring, the alignment spring including a loop sheet disposed on the outer surface of the slider and a tongue at a free end,
   wherein the free end of the alignment spring is bent toward the front surface of the slider and the tongue extends at a direction opposing a bent direction,
   wherein the tailgate leaf includes a notch to receive the tongue of the alignment spring, and
   wherein the tongue engages the notch to align an insertion of the slider into the body leaf and disengages the notch after the tailgate is attached to the box.

17. The hinge of claim 16, wherein the body leaf includes an end stop facing the front surface of the slider and a slot at the end stop, and the free end of the alignment spring pushes against the end stop to deform the alignment spring such that the tongue disengages from the notch of the tailgate leaf at an assembled state.

18. A vehicle, comprising:
   a box having a first sidewall and a second sidewall and defining a tailgate opening;
   a tailgate movably positionable within the tailgate opening;
   a first hinge to connect the tailgate to the first sidewall;
   a second hinge to connect the tailgate to the second sidewall, wherein each of the first and second hinges comprise:
   a hinge leaf attached to the tailgate,
   a body leaf attached to the first sidewall or the second sidewall, wherein the body leaf includes a first chamber and a second chamber connected to the first chamber;
   a slider including a hinge pivot connected to the tailgate leaf and a body movably positioned in the first chamber; and
   a locking mechanism including a locking wedge disposed in the second chamber, a cam lever, and a threaded shaft connecting the locking wedge and the cam lever,
   wherein the second chamber is configured to have a channel with different cross-sectional areas along a lengthwise direction of the threaded shaft,
   wherein the locking wedge includes a first surface adjacent to a first surface of the second chamber and a second surface adjacent to the slider,
   wherein the slider is locked relative to the first chamber when the locking wedge is moved to a first segment of the channel having a smaller cross-sectional area,
   wherein the slider is unlocked relative to the first chamber when the locking wedge is moved to a second segment of the channel having a larger cross-sectional area,
   wherein the tailgate is removable from the box when the locking wedge is at the second segment of the channel.

19. The vehicle of claim 18, wherein the first surface of the second chamber is tapered, and the first surface of the locking wedge is tapered,
   wherein the body of the slider includes an inner surface facing the locking wedge, an outer surface opposing the first surface, and a front surface,
   wherein the locking mechanism further includes an alignment spring, the alignment spring includes a loop sheet disposed on the outer surface of the slider and a tongue at a free end,
   wherein the free end of the alignment spring is bent toward the front surface of the slider and the tongue extends at a direction opposing a bent direction, wherein the tailgate leaf includes a notch to receive the tongue of the alignment spring, and wherein the tongue engages the notch such that the slider of the first hinge and the second hinge is aligned with corresponding first chamber to facilitate assembly of the tailgate by one user.

20. The vehicle of claim 18, wherein the second surface of the locking wedge is tapered, wherein the body of the slider includes an inner surface facing the locking wedge, an outer surface opposing and a front surface, and the inner surface of the slider is tapered, wherein the locking mechanism further includes an alignment spring, the alignment spring includes a loop sheet disposed on the outer surface of the slider and a tongue at a free end, wherein the free end of the alignment spring is bent toward the front surface of the slider and the tongue extends at a direction opposing a bent direction, wherein the tailgate leaf includes a notch to receive the tongue of the alignment spring, and wherein the tongue engages the notch such that the slider of the first hinge and the second hinge is aligned with corresponding first chamber to facilitate assembly of the tailgate by one user.

* * * * *